United States Patent
Biran et al.

(10) Patent No.: US 8,139,575 B2
(45) Date of Patent: Mar. 20, 2012

(54) DEVICE, SYSTEM AND METHOD OF MODIFICATION OF PCI EXPRESS PACKET DIGEST

(75) Inventors: Giora Biran, Zichron Yaacov (IL); Ilya Granovsky, Haifa (IL); Elchanan Perlin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 11/771,238

(22) Filed: Jun. 29, 2007

(65) Prior Publication Data

US 2009/0006932 A1 Jan. 1, 2009

(51) Int. Cl.
*H04L 12/28* (2006.01)
(52) U.S. Cl. .......................... 370/389; 370/230; 370/235
(58) Field of Classification Search .................. 370/235, 370/230, 352, 466, 470, 475, 245, 522, 535, 370/359, 412, 503, 355, 393, 389; 709/208, 709/233, 221, 220, 212; 710/300, 316, 268, 710/310, 31, 5, 313, 30, 22
See application file for complete search history.

(56) References Cited

U.S. PATENT DOCUMENTS

| | | | |
|---|---|---|---|
| 7,159,123 B1 | 1/2007 | Frantz | |
| 7,849,252 B2 * | 12/2010 | Wagh et al. | 710/313 |
| 2004/0054955 A1 | 3/2004 | Riley | |
| 2004/0153952 A1 | 8/2004 | Sharma et al. | |
| 2006/0092928 A1 * | 5/2006 | Pike et al. | 370/355 |
| 2006/0161709 A1 * | 7/2006 | Davies | 710/268 |
| 2006/0253619 A1 * | 11/2006 | Torudbakken et al. | 710/31 |
| 2007/0112994 A1 * | 5/2007 | Sandven et al. | 710/310 |
| 2009/0003335 A1 * | 1/2009 | Biran et al. | 370/389 |
| 2009/0049222 A1 * | 2/2009 | Lee et al. | 710/300 |
| 2010/0329285 A1 * | 12/2010 | Stanton et al. | 370/503 |

FOREIGN PATENT DOCUMENTS

| | | |
|---|---|---|
| JP | 10290270 A | 10/1998 |
| JP | 2003169304 A | 6/2003 |
| JP | 2007067634 A | 3/2007 |
| WO | 2005091156 A2 | 9/2005 |

OTHER PUBLICATIONS

PCI Express Base Specification Revision 1.0, Apr. 29, 2002, PCI-SIG, pp. 1-202.*
PCI Express EX IP Module <http://twinind.com/files/datasheets/PCIexpress_EZ_IP_Core_manual.pdf>.
"PCI Express Base Specification Revision 1.0—Transaction Layer", Apr. 29, 2002, pp. 43, 62, 63.

* cited by examiner

*Primary Examiner* — Aung S Moe
*Assistant Examiner* — Abdullah Riyami
(74) *Attorney, Agent, or Firm* — Suzanne Erez

(57) ABSTRACT

Device, system and method of modification of PCI Express packet digest. For example, an apparatus includes a credit-based flow control interconnect device to generate a credit-based flow control interconnect Transaction Layer Packet in which one or more bits of a digest portion carry non-ECRC data.

20 Claims, 3 Drawing Sheets

DEVICE, SYSTEM AND METHOD OF MODIFICATION OF PCI EXPRESS PACKET DIGEST

FIELD OF THE INVENTION

Some embodiments of the invention are related to the field of communication using Peripheral Component Interconnect (PCI) Express (PCIe).

BACKGROUND OF THE INVENTION

A computer system may include a PCI Express (PCIe) host bridge able to connect between devices, for example, between a processor and other units such as a graphics card, a memory unit, and the like. PCIe is an Input/Output (I/O) protocol allowing transfer of packetized data over high-speed serial interconnects with credit-based flow control. PCIe communication utilizes a layered protocol and includes a physical layer (to provide a link between devices), a data link layer (to provide packet sequencing, data protection, and acknowledgement signals), and a transaction layer. At the transaction layer, a PCIe Transaction Layer Packet (TLP) may include a packet header, a data payload, and an optional packet digest which may include End-to-End Cyclic Redundancy Check (ECRC) information, and which is included under the header credit for flow control.

Unfortunately, PCIe packets having a small data payload may result in significant link overhead. For example, PCIe packets having a small data payload consume both header credits and data credits without fully utilizing the data credit, thereby contributing to the link overhead.

SUMMARY OF THE INVENTION

Some embodiments of the invention include, for example, devices, systems and methods of modification of PCI Express (PCIe) packet digest.

In some embodiments, an apparatus includes a credit-based flow control interconnect device to generate a credit-based flow control interconnect Transaction Layer Packet in which one or more bits of a digest portion carry non-ECRC data.

In some embodiments, the non-ECRC data includes application-specific data.

In some embodiments, a header of the Transaction Layer Packet includes an indication that the digest carries non-ECRC data.

In some embodiments, a header of the Transaction Layer Packet includes an indication that the digest carries application-specific data.

In some embodiments, a header of the Transaction Layer Packet includes an indication that a receiving device is to decode the non-ECRC carried in the digest.

In some embodiments, a header of the Transaction Layer Packet includes an indication that an intermediate device is to disregard a result of an ECRC check of the Transaction Layer Packet.

In some embodiments, the credit-based flow control interconnect device includes a PCI Express device, and the credit-based flow control interconnect Transaction Layer Packet includes a PCI Express Transaction Layer Packet.

In some embodiments, a method includes: generating a credit-based flow control interconnect Transaction Layer Packet in which one or more bits of a digest portion carry non-ECRC data.

In some embodiments, generating includes: placing the non-ECRC data in a digest space corresponding to ECRC data.

In some embodiments, generating includes: placing in a header of the Transaction Layer Packet an indication that said digest carries non-ECRC data.

In some embodiments, generating includes: placing in a header of the Transaction Layer Packet an indication that said digest carries application-specific data.

In some embodiments, generating includes: placing in a header of the Transaction Layer Packet an indication that a receiving device is to decode the non-ECRC carried in the digest.

In some embodiments, generating includes: placing in a header of the Transaction Layer Packet an indication that an intermediate device is to disregard a result of an ECRC check of said Transaction Layer Packet and to transfer the Transaction Layer Packet.

In some embodiments, generating the credit-based flow control interconnect Transaction Layer Packet includes generating a PCI Express Transaction Layer Packet.

In some embodiments, generating includes: sending application-specific data using a header credit.

In some embodiments, a system includes: a credit-based flow control interconnect device to generate a credit-based flow control interconnect Transaction Layer Packet in which one or more bits of a digest portion carry non-ECRC data; and a credit-based flow control interconnect link to transfer the Transaction Layer Packet.

In some embodiments, based on an indication in a header of the Transaction Layer Packet, the credit-based flow control interconnect link is to disregard a result of an ECRC check of said Transaction Layer Packet.

In some embodiments, the system further includes an additional credit-based flow control interconnect device to receive the Transaction Layer Packet and to extract the non-ECRC data from the digest.

In some embodiments, based on an indication in a header of the Transaction Layer Packet, the additional credit-based flow control interconnect link is to avoid performing an ECRC check of said Transaction Layer Packet.

In some embodiments, the credit-based flow control interconnect device includes a PCI Express device, the credit-based flow control interconnect Transaction Layer Packet includes a PCI Express Transaction Layer Packet, and the credit-based flow control interconnect link includes a PCI Express link.

Some embodiments include, for example, a computer program product including a computer-useable medium that includes a computer-readable program which, when executed on a computer, causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Further, reference numerals may be repeated among the figures to indicate corresponding or analogous elements. Moreover, some of the blocks depicted in the drawings may be combined into a single function. The figures are listed below.

DETAILED DESCRIPTION

Figure 1:
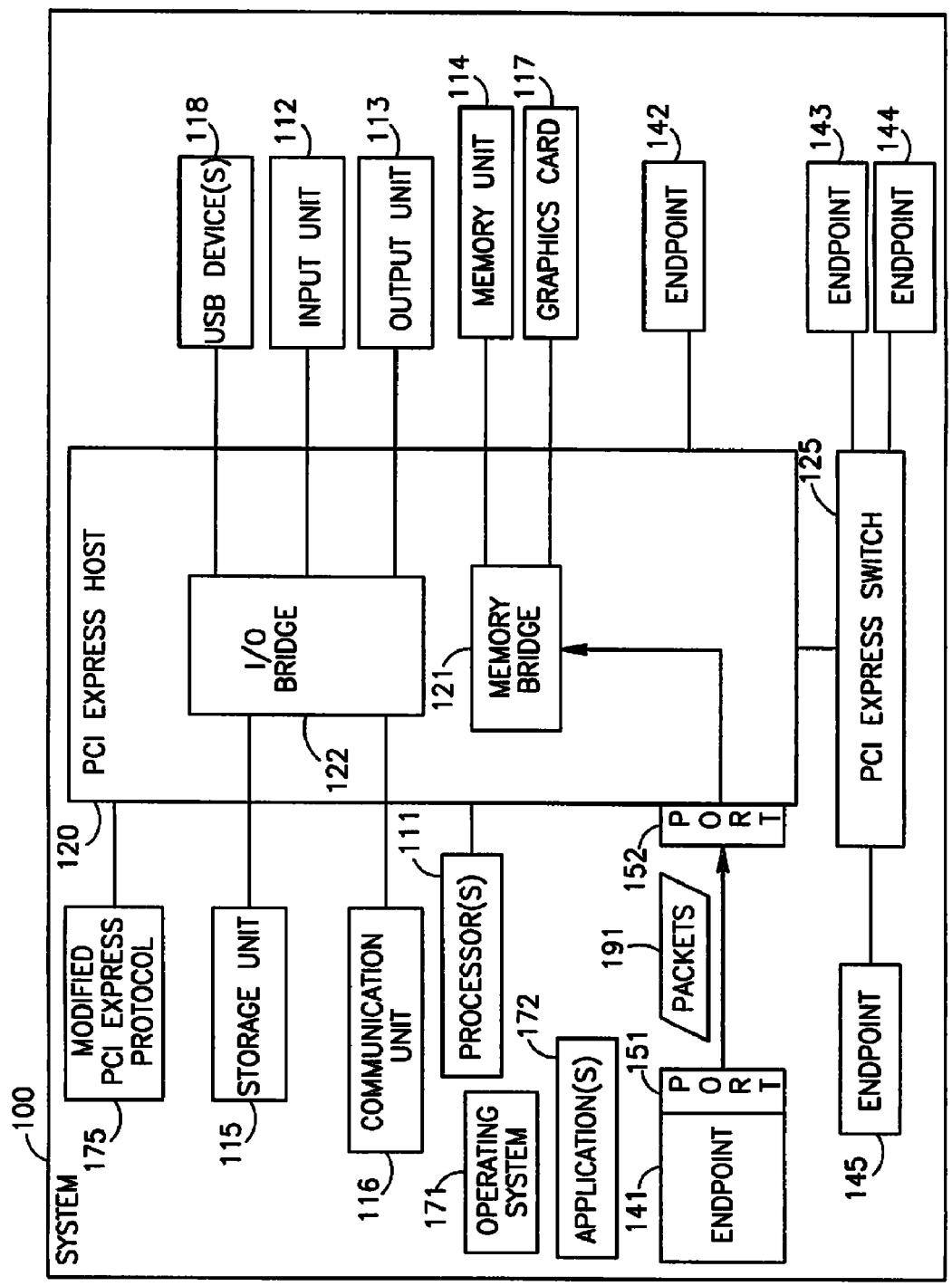
FIG. 1 is a schematic block diagram illustration of a system able to utilize modified PCI Express packet digests in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Portions of the discussion herein utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used herein to describe two or more items; for example, a plurality of items includes two or more items.

Although portions of the discussion herein may relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The terms "sending device" or "sending endpoint" or "sending port" as used herein include, for example, a PCIe device, a PCIe endpoint, a PCIe port, or other PCIe unit or PCIe-compatible unit able to send or transfer-out PCIe data, packets, and/or other communications. The terms "receiving device" or "receiving endpoint" or "receiving port" as used herein include, for example, a PCIe device, a PCIe endpoint, a PCIe port, or other PCIe unit or PCIe-compatible unit able to receive or transfer-in PCIe data, packets, and/or other communications.

The term "data payload" as used herein includes, for example, a portion or a content of a PCIe Transaction Layer Packet (TLP) that includes substantive data or application-specific data or the like; a TLP portion or TLP content that does not include meta-data, structural information or control information; a non-header TLP portion or TLP content; a non-digest TLP portion or TLP content; a non-header and non-digest portion of a TLP; or other portion, segment, field or space of a TLP which stores or is able to store or is designated to store or carry application-specific data or substantive data.

The terms "digest" or "packet digest" or "PCIe packet digest" or "PCIe TLP digest" or "digest portion" or "digest field" or "digest segment" as used herein may include, for example, a portion or content of a PCIe TLP that is optionally appended to the TLP; a TLP portion or TLP content that is used, in whole or in part, for ECRC, CRC, or other data protection mechanisms or data checking mechanisms or data integrity mechanisms or data verification mechanisms; a 32-bit portion or content or other size portion or content located at the end of a TLP or appended to a TLP or appended to a TLP data payload; a space corresponding to the last 32-bits of a TLP; or any non-header and non-data-payload portion or content of a TLP, e.g., that utilizes header flow control credits.

The terms "Double Word" or "DWord" or "DW" as used herein include, for example, a data unit having a size of four bytes or 32 bits.

The terms "non-ECRC data" or "non-ECRC information" or "non-CRC data" or "non-CRC information" as used herein include, for example, data or information which is not used for ECRC or CRC purposes; data or information other than ECRC or CRC data; substantive data; application-specific data; or the like.

Although portions of the discussion herein relate, for demonstrative purposes, to PCIe communications or devices, embodiments of the invention may be used with other types of communications or devices, for example, communications or devices utilizing transfer of packetized data over high-speed serial interconnects, communications or devices utilizing flow control-based link management, communications or devices utilizing credit-based flow control, communications or devices utilizing a fully-serial interface, communications or devices utilizing a split-transaction protocol implemented with attributed packets, communications or devices that prioritize packets for improved or optimal packet transfer, communications or devices utilizing scalable links having one or more lanes (e.g., point-to-point connections), communications or devices utilizing a high-speed serial interconnect, communications or devices utilizing differentiation of different traffic types, communications or devices utilizing a highly reliable data transfer mechanism (e.g., using sequence numbers and/or end-to-end cyclic redundancy check (ECRC)), communications or devices utilizing a link layer to achieve integrity of transferred data, communications or devices utilizing a physical layer of two low-voltage differentially driven pairs of signals (e.g., a transmit pair and a receive pair), communications or devices utilizing link initialization including negotiation of lane widths and frequency of operation, communications or devices allowing to transmit a data packet only when it is known that a receiving buffer is available to receive the packet at the receiving side, communications or devices utilizing request packets and/or response packets, communications or devices utilizing Message Space and/or Message Signaled Interrupt (MSI) and/or in-band messages, communications or devices utilizing a software layer configuration space, communications or devices utilizing a Maximum Payload Size (MPS) parameter, or the like.

As an overview, some embodiments of the invention provide a modified PCIe protocol to allow a modified use of a TLP digest, for example, for carrying data payload without consuming data credits. The modified PCIe protocol allows different usage models of the modified TLP digest (or of a space or a communication portion corresponding to the TLP digest) instead of or in addition to the conventional use of the TLP digest for ECRC. Some embodiments utilize the packet space corresponding to the TLP digest in order to carry or transfer or store one DWord or up to one DWord of generic content, for example, substantive information or data, control information or data, and/or data payload that may not consume data credits or other data resources. Some demonstrative examples of suitably small data payload transmissions which may be carried using the modified TLP digest include status indications, registers data, protection keys, and the like. In some embodiments, a PCIe TLP having a small data payload is sent, transported, and received substantially without consuming data resources, for example, by sending data in the space corresponding to the packet digest and consuming only header flow control credits.

Although portions of the discussion herein may relate, for demonstrative purposes, to communications utilizing the PCIe protocol, embodiments of the invention may also be used in conjunction with other suitable communication systems, devices, methods and/or protocols; for example, in communication systems or protocols in which ECRC is optional or not critical; in communication systems or protocols that utilize a reliable link; or the like. By way of example, PCI Express links support link layer CRC (LCRC) to provide error detection at the data link layer for PCIe packets, and additional ECRC protection such as in a TLP digest is optional at the transaction layer. Furthermore, ECRC may not be critical in a PCI Express system for devices that are directly coupled to a PCIe host, and/or in cases where the intermediate components are reliable to substantially preserve and/or transfer TLP content.

In some embodiments, a transaction initiator or sending device constructs, creates or generates a TLP according the modified PCIe protocol and indicates the presence of an application-specific packet digest, for example, using an indication bit or flag or parameter in the TLP header. A receiving endpoint or receiving device decodes the packet digest based on the TLP header indication. An intermediate PCIe device (e.g., a PCIe switch) relays, routes and/or transfers the TLP including the application-specific digest, according to the PCIe protocol and/or the modified PCIe protocol.

FIG. 1 schematically illustrates a block diagram of a system 100 able to utilize PCIe packet digests in accordance with some demonstrative embodiments of the invention. System 100 may be or may include, for example, a computing device, a computer, a personal computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, a communication unit 116, and a graphics card 117. System 100 may optionally include other suitable hardware components and/or software components.

Processor 111 may include, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific integrated circuit (ASIC), or any other suitable multi-purpose or specific processor or controller. Processor 111 may execute instructions, for example, of an operating system (OS) 171 of system 100 or of one or more software applications 172.

Input unit 112 may include, for example, a keyboard, a keypad, a mouse, a touch-pad, a stylus, a microphone, or other suitable pointing device or input device. Output unit 113 may include, for example, a cathode ray tube (CRT) monitor or display unit, a liquid crystal display (LCD) monitor or display unit, a screen, a monitor, a speaker, or other suitable display unit or output device. Graphics card 117 may include, for example, a graphics or video processor, adapter, controller or accelerator.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

Communication unit 116 may include, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include or may optionally be associated with, for example, one or more antennas such as a dipole antenna, a monopole antenna, an omni-directional antenna, an end fed antenna, a circularly polarized antenna, a micro-strip antenna, a diversity antenna, or the like.

In some embodiments, the components of system 100 may be enclosed in, for example, a common housing, packaging, or the like, and may be interconnected or operably associated using one or more wired or wireless links. In other embodiments, for example, components of system 100 may be distributed among multiple or separate devices, may be implemented using a client/server configuration or system, may communicate using remote access methods, or the like.

System 100 may further include a PCIe host bridge 120 able to connect among multiple components of system 100, for example, among multiple PCIe endpoints or PCIe devices. The PCIe host bridge 120 may include a memory bridge 121 or other memory controller, to which the memory unit 114 and/or the graphics card 117 may be connected. The PCIe host bridge 120 may further include an input/output (I/O) bridge 122, to which the input unit 112, the output unit 113, the storage unit 115, the communication unit 116, and one or more universal serial bus (USB) devices 118 may be connected.

System 100 may further include a PCIe switch 125 able to interconnect among multiple PCIe endpoints or PCIe devices. In some embodiments, the PCIe switch 125 may be implemented as a separate or stand-alone unit or component; in other embodiments, the PCIe switch 125 may be integrated in, embedded with, or otherwise implemented using the PCIe host bridge 120 or other suitable component.

The topology or architecture of FIG. 1 is shown for demonstrative purposes, and embodiments of the invention may be used in conjunction with other suitable topologies or architectures. For example, in some embodiments, memory bridge 121 is implemented as a memory controller and is included or embedded in the PCIe host bridge 120. In some embodiments, a "north bridge" or a "south bridge" are used, and optionally include the PCIe host bridge 120 and/or a similar PCIe host component. In some embodiments, memory bridge 121 and PCIe host bridge 120 (and optionally the processor 111) are implemented using a single or common Integrated Circuit (IC), or using multiple ICs. Other suitable topologies or architectures may be used.

The PCIe host bridge 120 and/or the PCIe switch 125 may interconnect among multiple PCIe endpoints or PCIe devices, for example, endpoints 141-145. Some PCIe devices or endpoints (e.g., PCIe endpoints 141 and 142) are connected directly through the PCIe host bridge 120; whereas other PCIe endpoints (e.g., PCIe endpoints 143-145) are connected indirectly using the PCIe switch 125. For demonstrative purposes, endpoint 141 may send data to the memory bridge 121; accordingly, endpoint 141 is referred to herein as "sending endpoint" or "sending device", whereas the memory bridge 121 is referred to herein as "receiving endpoint" or "receiving device".

Other components may operate as a sending device and/or as a receiving device. For example, processor 111 may be a sending device and memory unit 114 may be a receiving device; USB device 118 may be a sending device and storage unit 115 may be a receiving device; the memory bridge 121 may operate as a receiving device (e.g., vis-à-vis a first endpoint or component) and/or may operate as a sending device (e.g., vis-à-vis a second endpoint or component); or the like. In some embodiments, the receiving device may send back data or control data to the sending device, or vice versa; for example, the communication between the sending device and the receiving device may be unilateral or bilateral.

Optionally, the sending device may operate utilizing a device driver, and the receiving device may operate utilizing a device driver. In some embodiments, the device drivers, as well as PCIe host bridge 120 and PCIe switch 125, may support a modified PCIe protocol 175 in accordance with some embodiments of the invention. The sending device is connected to (or includes) a PCIe port 151 (an "upstream port", or a "downstream-facing port"). The receiving device is connected to (or includes) a PCIe port 152, for example, a PCIe port of the PCIe host bridge 120 (a "downstream port", or an "upstream-facing port").

In some embodiments, packets 191 may pass through or be relayed by an intermediate PCIe device between the sending device and the receiving device. For example, where endpoint 145 is the sending device and memory bridge 121 is the receiving device, PCIe switch 125 is an intermediate device between the sending endpoint 145 and receiving memory bridge 121.

In some embodiments, the sending device transfers data to the receiving device using the modified PCIe protocol 175, namely, utilizing a generic or application-specific packet digest to transport data payload without consuming data flow control credits or additional data flow control credits. For example, non-ECRC data may be included in a TLP digest according to the modified PCIe protocol and sent using only header flow control credits. The sending device constructs a modified TLP 191 having one or more indications in the packet header to indicate that a digest is appended to the packet, to indicate that the digest does not include ECRC data, and/or to indicate that a CRC check should be ignored.

In some embodiments, the space corresponding to a TLP digest may be used to store or carry various types of information such as, for example, status vectors (for example, carried with responses to non-posted requests), protection keys, end-to-end flow control or any other application-specific single-DW payload. Embodiments may allow more optimal utilization of digest resources without compromising data integrity, for example, by sending data that does not require extended ECRC protection in the packet digest instead of as regular data payload.

Some embodiments allow utilization of digest space (e.g., four bytes per TLP) for application-specific data or tasks, instead of requiring that the application utilize data payload for such data tasks. Therefore, some embodiments reduce application-specific data payload usage, which requires allocation of additional data buffers and/or associated credits, as well as introduces packet overhead of up to approximately 20 percent of theoretical link bandwidth (e.g., for short packets traffic). Embodiments of the invention may provide other advantages or benefits.

In some embodiments, the modified PCIe protocol 175 utilizes Flow Control based link management for efficient data transfer between devices attached to a link. For example, substantially each PCIe device advertises to other PCIe device(s) the capabilities of its receive buffer, e.g., using terms of "credits" or other receiver buffering units. Each transmitted packet consumes a certain number of credits. Occasionally, the receiving PCIe device updates the sending PCIe device about additional amount of buffer space (e.g., released credits) that becomes available for new packets (e.g., due to removal of old data from the receive buffer). The sending PCIe device accumulates available credits advertised by the remote receiver, and compares them to the total number of credits that the sending device consumed by sending packets so far. The sending device is allowed to send a new packet only if there are enough credits available on the receiving device side. Lack of credits results in transmission stall, leading to performance degradation. In accordance with some embodiments, the modified PCIe protocol 175 allows a sending PCIe device to store application-specific data in a space corresponding to the TLP digest or a portion thereof (e.g., the ECRC portion), thereby allowing to send an increased amount of substantive data in the TLP and to utilize the available credits more efficiently.

The modified PCIe protocol 175 utilizes the specification of separate credits for PCIe TLP header (e.g., in header units) and PCIe TLP data (e.g., in 16-byte units). A PCIe TLP may include only the header, and thus consume only one header credit; or, a PCIe TLP having data payload may consume one header credit and a number of data credits equivalent to the data payload size. The PCIe TLP digest (e.g., one DW used for ECRC) is accounted by the header credit and does not require consumption of data credits. Therefore, in some embodiments, usage of TLP digest for carrying and transferring application-specific data saves data credits. Some embodiments thus utilize the PCIe mechanism which separates or distinguishes between header credits and data credits, in order to reduce data buffer consumption and/or credit consumption, for example, by storing and carrying application-specific data (e.g., non-ECRC data) in a portion of a PCIe TLP (e.g., in the digest or in a portion thereof) which is covered by header credit(s).

Figure 2:
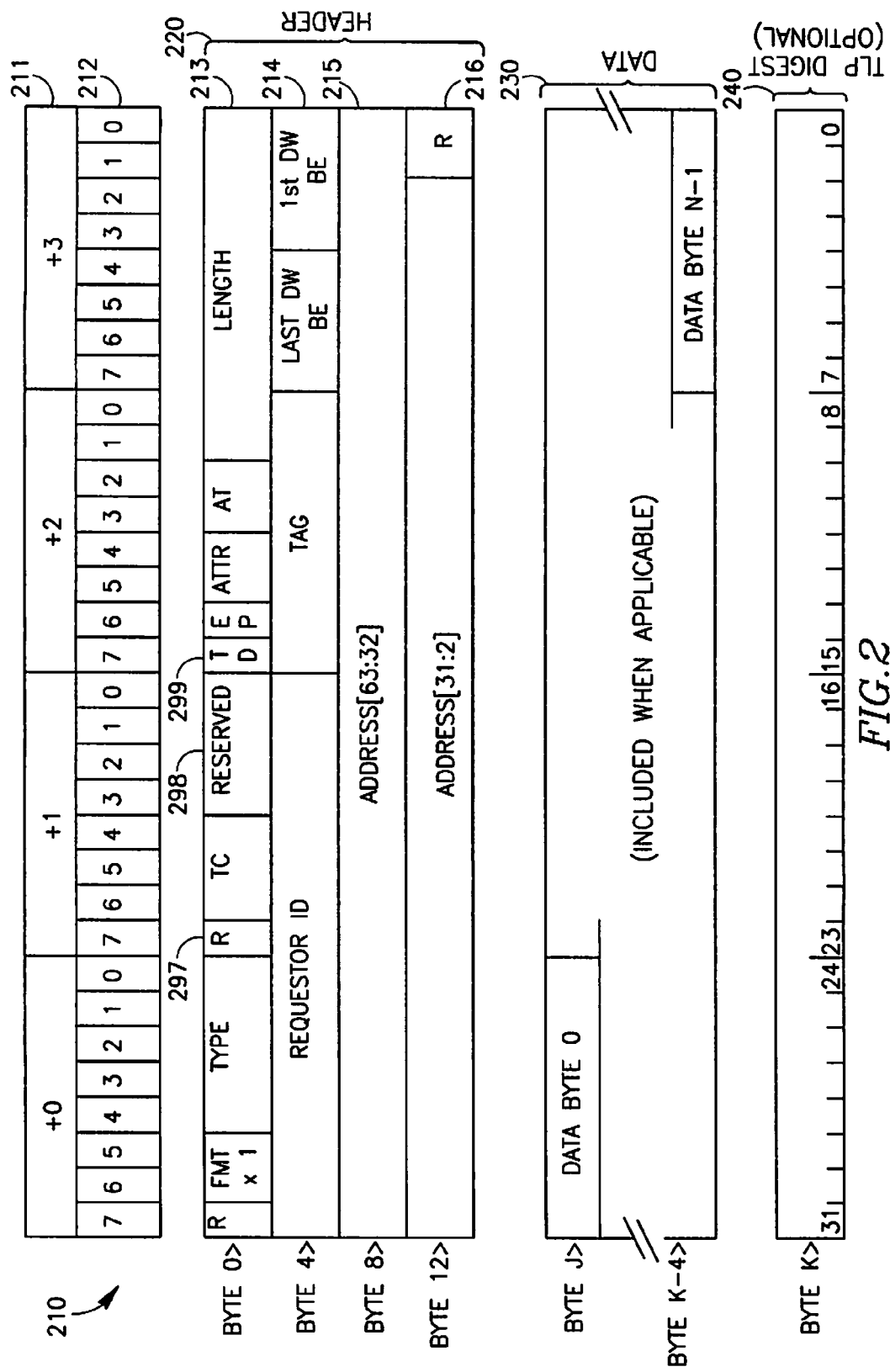
FIG. 2 is a schematic block diagram illustration of structure of a modified PCI Express packet in accordance with a demonstrative embodiment of the invention.

FIG. 2 schematically illustrates structure of a PCIe packet 210 including a modified TLP digest in accordance with some demonstrative embodiments of the invention. Although portions of the discussion herein relate, for demonstrative purposes, to PCIe TLP structure utilizing 64-bit addressing, embodiments of the invention are not limited in this regard, and may be used in conjunction with other PCIe TLP structures, for example, structures utilizing 32-bit addressing or other suitable structures or sizes.

Packet 210 is a four Double Word structure and includes a header portion 220, a data portion 230, and a digest portion 240. A first row 211 indicates the byte offset (for example, +0, +1, +2 and +3); and a second row 212 indicates the bit count (for example, eight bits numbered from 0 to 7). Header 220 includes fields of control information (including, for example, a format field, a type field, a length field, an ID field, a tag field, and the like) occupying eights bytes, as indicated in rows 213 and 214. Rows 215 and 216 include a 64-bit address, for example, a request address having two reserved lower bits. Rows 213-216 correspond to the header portion 220 of packet 210.

Data portion 230 of TLP 210 is used to carry payload data, where applicable. Some TLP's may include a data payload portion 230, whereas other TLPs may not include a data payload portion 230. In accordance with the credit-based flow control protocol, utilizing data portion 230 of the TLP to transport data requires data flow-control credits, and may not be efficient for very small data payloads.

Digest portion 240 includes an optional TLP digest that may be appended to the TLP. In some embodiments, packet 210 includes additional substantive data or non-ECEC data stored and/or carried in the space corresponding to a TLP digest. The additional space in digest 240 does not store ECRC information, and instead stores other or alternate information, for example, application-specific data or non-ECRC data.

In some embodiments, the header of modified TLP 210 includes one or more indication bits or flags or fields to indicate the presence of a TLP digest having application-specific data or non-ECRC data. For example, a TLP Digest (TD) indication bit 299 may indicate digest presence. One or more designated bits or flags or fields of header 220, for example, reserved bit 297 and/or reserved field 298, may be used to indicate that the digest includes application-specific data or non-ECRC data, to indicate that the digest does not include ECRC information, to indicate that ECRC check is to be ignored, and/or to indicate that substantive data or non-ECRC data should be read or collected (e.g., by the receiving device) from the space corresponding to the TLP digest or from a pre-defined portion of that space.

Figure 3:
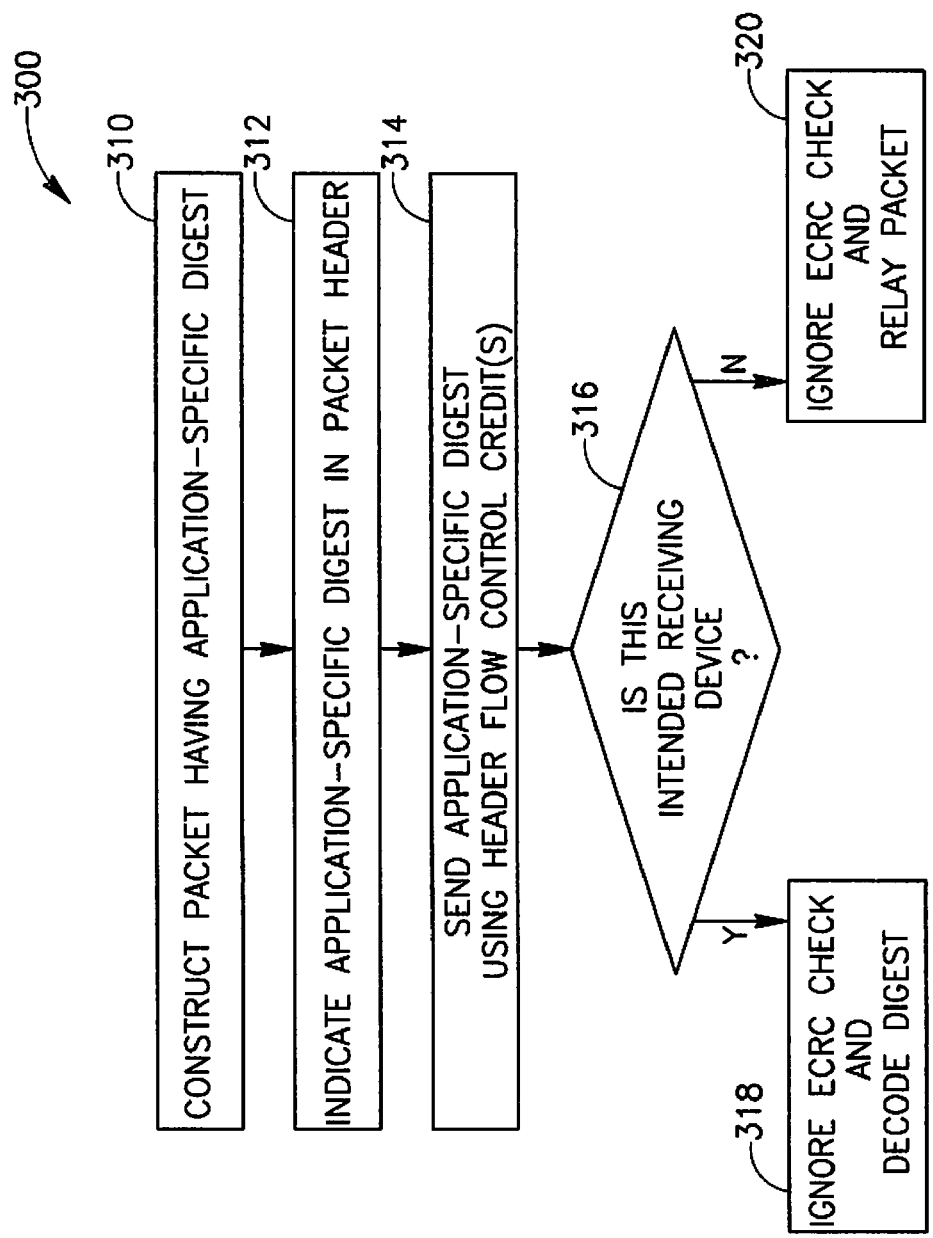
FIG. 3 is a schematic flow-chart of a method of utilizing modified PCI Express packet digests in accordance with a demonstrative embodiment of the invention.

FIG. 3 is a schematic flow-chart of a method 300 of utilizing modified PCI Express packet digests in accordance with some demonstrative embodiments of the invention. Operations of the method may be used, for example, by system 100 of FIG. 1, and/or by other suitable units, devices and/or systems.

In some embodiments, the method includes constructing or generating a PCIe TLP having an application-specific digest (block 310). For example, the application-specific digest may include non-ECRC data or generic data or application-specific data to be carried in the space corresponding to the digest portion of the packet. For example, non-ECRC data may be placed or stored in a digest space corresponding to (or previously allocated to) ECRC data.

As indicated at block 312, the method includes indicating the application-specific digest in the header of the TLP. For example, the TD indication bit or field, and/or a reserved or application-specific indication bit or field, are used to indicate in the packet header the presence of application-specific data in the digest. In some embodiments, a value of "one" in the TD indication bit may indicate presence of a digest, and an application-specific indication bit or flag or field may further indicate the digest type or digest length; in other embodiments, a value of "zero" in the TD indication bit may indicate a non-ECRC digest. Other suitable values or indications may be used.

As indicated at block 314, the method may include sending data that is included in the application-specific digest, using header flow control credits. When application-specific data is included in the space corresponding to the TLP digest, such data is covered by the header credits and does not consume data credits. In contrast, if the application-specific data is sent regularly as a data payload, one or more data credits are consumed (e.g., in addition to header credit consumed by TLP header regardless of the digest presence).

As indicated at block 316, the handling of the TLP digest may be different, for example, depending on whether or not the PCIe device is the receiving device (block 318) or an intermediate device (block 320).

As indicated at block 318, a receiving device reads and extracts the application-specific data from the modified TLP digest. The receiving device may receive and decode an indication in the header of the modified TLP that the TLP includes data payload in the message digest, and/or that the TLP does not include ECRC in the message digest, for example, as indicated by the TD indication bit and/or by another designated indication bit or field. In cases where an ECRC check is performed on an unmodified TLP, for example, as indicated by the TD bit, the receiving device ignores the ECRC check on the modified TLP (e.g., by skipping or avoiding or disabling an ECRC mechanism, or by disregarding the results of the ECRC process) and extracts or decodes the application-specific data from the modified TLP digest.

As indicated at block 320, an intermediate device (e.g., a PCIe switch or other PCIe device that is not the intended receiving device), relays or transfers the TLP substantially without accessing or altering the message digest. If the intermediate device supports ECRC check, the intermediate device may be directed to not perform the ECRC check (or to disregard the ECRC check results), for example, through an indication in a designated bit or flag or field in the modified TLP header, or via a system configuration to disable ECRC.

Other suitable operations or sets of operations may be used in accordance with embodiments of the invention.

Some embodiments of the invention may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium include a semiconductor or solid-state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output of I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. Modems, cable modems and Ethernet cards are demonstrative examples of types of network adapters in some embodiments of the invention. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus for modifying Peripheral Component Interconnect (PCI) express packet digest, said apparatus comprising:
    a credit-based flow control interconnect device to generate a credit-based flow control interconnect Transaction Layer Packet (TLP) in which one or more bits of a digest portion carry non End-to-End Cyclic Redundancy Check (ECRC) data;
    wherein a header portion of said TLP comprises an indication that said digest portion carries the non-ECRC data; and
    wherein said digest portion is used to transport the non ECRC data unrelated to any TLP protocol comprising application specific data thereby reducing data credits consumed by said TLP.

2. The apparatus of claim 1, wherein the non-ECRC data comprises application-specific data unrelated to TLP data poisoning.

3. The apparatus of claim 1, wherein a header of the Transaction Layer Packet comprises an indication that said digest portion carries non-ECRC data.

4. The apparatus of claim 1, wherein a header of the Transaction Layer Packet comprises an indication that said digest portion carries application-specific data unrelated to TLP poisoning.

5. The apparatus of claim 1, wherein a header of the Transaction Layer Packet comprises an indication that a receiving device is to decode the non-ECRC data carried in the digest portion.

6. The apparatus of claim 1, wherein a header of the Transaction Layer Packet comprises an indication that an intermediate device is to disregard a result of an ECRC check of said Transaction Layer Packet.

7. The apparatus of claim 1, wherein the credit-based flow control interconnect device comprises a PCI Express device, and wherein the credit-based flow control interconnect Transaction Layer Packet comprises a PCI Express Transaction Layer Packet.

8. A method for modifying Peripheral Component Interconnect (PCI) express packet digest, said method comprising:
    generating a credit-based flow control interconnect Transaction Layer Packet (TLP) in which one or more bits of a digest portion carry non End-to-End Cyclic Redundancy Check (ECRC) data;
    including in a header portion of said TLP an indication that said digest portion carries non-ECRC data; and
    utilizing said digest portion to transport non ECRC data unrelated to any TLP protocol comprising application specific data thereby reducing the data credits consumed by said TLP.

9. The method of claim 8, wherein generating comprises:
    placing the non-ECRC data in a digest space that normally corresponds to ECRC data.

10. The method of claim 8, wherein generating comprises:
    placing in a header of the Transaction Layer Packet an indication that said digest portion carries non-ECRC data unrelated to TLP poisoning.

11. The method of claim 8, wherein generating comprises:
    placing in a header of the Transaction Layer Packet an indication that said digest portion carries application-specific data unrelated to TLP poisoning.

12. The method of claim 8, wherein generating comprises:
    placing in a header of the Transaction Layer Packet an indication that a receiving device is to decode the non-ECRC data carried in the digest portion.

13. The method of claim 8, wherein generating comprises:
    placing in a header of the Transaction Layer Packet an indication that an intermediate device is to disregard a result of an ECRC check of said Transaction Layer Packet and to transfer the Transaction Layer Packet.

14. The method of claim 8, wherein generating the credit-based flow control interconnect Transaction Layer Packet comprises generating a PCI Express Transaction Layer Packet.

15. The method of claim 8, further comprising:
    sending application-specific data using a header credit.

16. A system for modifying Peripheral Component Interconnect (PCI) express packet digest, said system comprising:
    a credit-based flow control interconnect device to generate a credit-based flow control interconnect Transaction Layer Packet (TLP) in which one or more bits of a digest portion carry non End-to-End Cyclic Redundancy Check (ECRC) data;
    a credit-based flow control interconnect link to transfer the Transaction Layer Packet;
    wherein a header portion of said TLP comprises an indication that said digest portion carries non-ECRC data; and
    wherein said digest portion is used to transport non ECRC data unrelated to any TLP protocol comprising application specific data thereby reducing the data credits consumed by said TLP.

17. The system of claim 16, wherein based on an indication in a header of the Transaction Layer Packet, the credit-based flow control interconnect link is to disregard a result of an ECRC check of said Transaction Layer Packet.

18. The system of claim 16, further comprising:
    an additional credit-based flow control interconnect device to receive the Transaction Layer Packet and to extract the non-ECRC data from the digest portion.

19. The system of claim 18, wherein based on an indication in a header of the Transaction Layer Packet, the additional credit-based flow control interconnect link is to avoid performing an ECRC check of said Transaction Layer Packet.

20. The system of claim 16, wherein the credit-based flow control interconnect device comprises a PCI Express device, wherein the credit-based flow control interconnect Transaction Layer Packet comprises a PCI Express Transaction Layer Packet, and wherein the credit-based flow control interconnect link comprises a PCI Express link.

* * * * *